(12) United States Patent
Yoshida et al.

(10) Patent No.: US 11,603,138 B2
(45) Date of Patent: Mar. 14, 2023

(54) VEHICLE BODY

(71) Applicants: TOYOTA JIDOSHA KABUSHIKI KAISHA, Aichi-ken (JP); SUBARU CORPORATION, Tokyo (JP)

(72) Inventors: Sachiko Yoshida, Nisshin (JP); Yu Koganemaru, Okazaki (JP); Tadashi Itoh, Toyota (JP); Shinya Kamimura, Toyota (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/497,983

(22) Filed: Oct. 11, 2021

(65) Prior Publication Data
US 2022/0177038 A1 Jun. 9, 2022

(30) Foreign Application Priority Data

Dec. 9, 2020 (JP) .............................. JP2020-204132

(51) Int. Cl.
| | |
|---|---|
| *B62D 25/06* | (2006.01) |
| *B62D 25/04* | (2006.01) |
| *B62D 27/02* | (2006.01) |
| *B62D 25/02* | (2006.01) |
| *B62D 21/08* | (2006.01) |

(52) U.S. Cl.
CPC .............. *B62D 25/06* (2013.01); *B62D 25/02* (2013.01); *B62D 25/04* (2013.01); *B62D 27/023* (2013.01); *B60Y 2304/07* (2013.01); *B62D 21/08* (2013.01); *B62D 25/025* (2013.01)

(58) Field of Classification Search
CPC ...... B62D 25/04; B62D 25/06; B62D 27/023; B62D 25/02
USPC ......................... 296/23.01, 3, 4, 210, 29, 30
See application file for complete search history.

(56) References Cited

U.S. PATENT DOCUMENTS 4,717,197 A * 1/1988 Harasaki ................ B62D 25/02
296/202

FOREIGN PATENT DOCUMENTS

| JP | 2008284936 A | 11/2008 |
|---|---|---|
| JP | 2011207288 A | 10/2011 |

* cited by examiner

*Primary Examiner* — Dennis H Pedder
(74) *Attorney, Agent, or Firm* — Hauptman Ham, LLP

(57) ABSTRACT

A vehicle body includes a rear pillar, a roof siderail, and a side inner panel. The rear pillar is disposed to a side of a rear hatch, and extends in an up-down direction. The roof siderail extends in a vehicle body front-rear direction at a side of a roof, and a rear end thereof is linked to the rear pillar. The side inner panel is linked to the rear pillar and the roof siderail. The roof siderail has a tubular shape, and bulges further into a vehicle cabin than an upper end of the side inner panel.

3 Claims, 4 Drawing Sheets

VEHICLE BODY

CROSS-REFERENCE TO RELATED APPLICATION

This application claims priority to Japanese Patent Application No. 2020-204132 filed on Dec. 9, 2020, incorporated herein by reference in its entirety.

BACKGROUND

1. Technical Field

The present disclosure relates to a vehicle body of an automobile.

2. Description of Related Art

Japanese Unexamined Patent Application Publication No. 2011-207288 (JP 2011-207288 A) and Japanese Unexamined Patent Application Publication No. 2008-284936 (JP 2008-284936 A) disclose a vehicle body provided with a rear hatch, rear pillars disposed to the sides of the rear hatch, and roof siderails extending in the vehicle body front-rear direction at the sides of a roof. Rear ends of the roof siderails are linked to the rear pillars. The rear pillars are sometimes referred to as "D-pillars".

SUMMARY

The structure in the proximity of linking portions of the rear ends of the roof siderails and the rear pillars affects the strength of the rear portion of the vehicle body. The present disclosure provides technology that raises the strength of the rear portion of the vehicle body.

A vehicle body according to an aspect of the present disclosure includes a rear pillar, a roof siderail, and a side inner panel. The rear pillar is disposed to a side of a rear hatch, and extends in an up-down direction. The roof siderail extends in a vehicle body front-rear direction at a side of a roof, and a rear end thereof is linked to the rear pillar. The side inner panel is linked to the rear pillar and the roof siderail. The roof siderail has a tubular shape, and bulges further into a vehicle cabin than an upper end of the side inner panel. In this vehicle body according to the aspect of the present disclosure, due to the roof siderail bulging further into the vehicle cabin than the upper end of the side inner panel, effects of the roof siderail suppressing vibrations of the rear pillar (vibrations in the vehicle-width direction at the upper portion of the rear pillar) while traveling are increased. In other words, according to the above structure, rigidity of the vehicle body rear portion as to torsional vibration mode around a roll axis of the vehicle body becomes higher. That is to say, the strength of the rear portion of the vehicle body increases.

In the vehicle body according to the aspect of the present disclosure, extending portions may extend from both right and left sides of the rear end of the roof siderail, the two extending portions sandwich the rear pillar. Also, in the vehicle body according to the aspect of the present disclosure, the side inner panel may be provided with a window hole in which a quarter glass is attached. In the vehicle body according to the aspect of the present disclosure, a rear portion of a vehicle cabin side of the roof siderail, and the side inner panel, may be configured from a single metal sheet.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
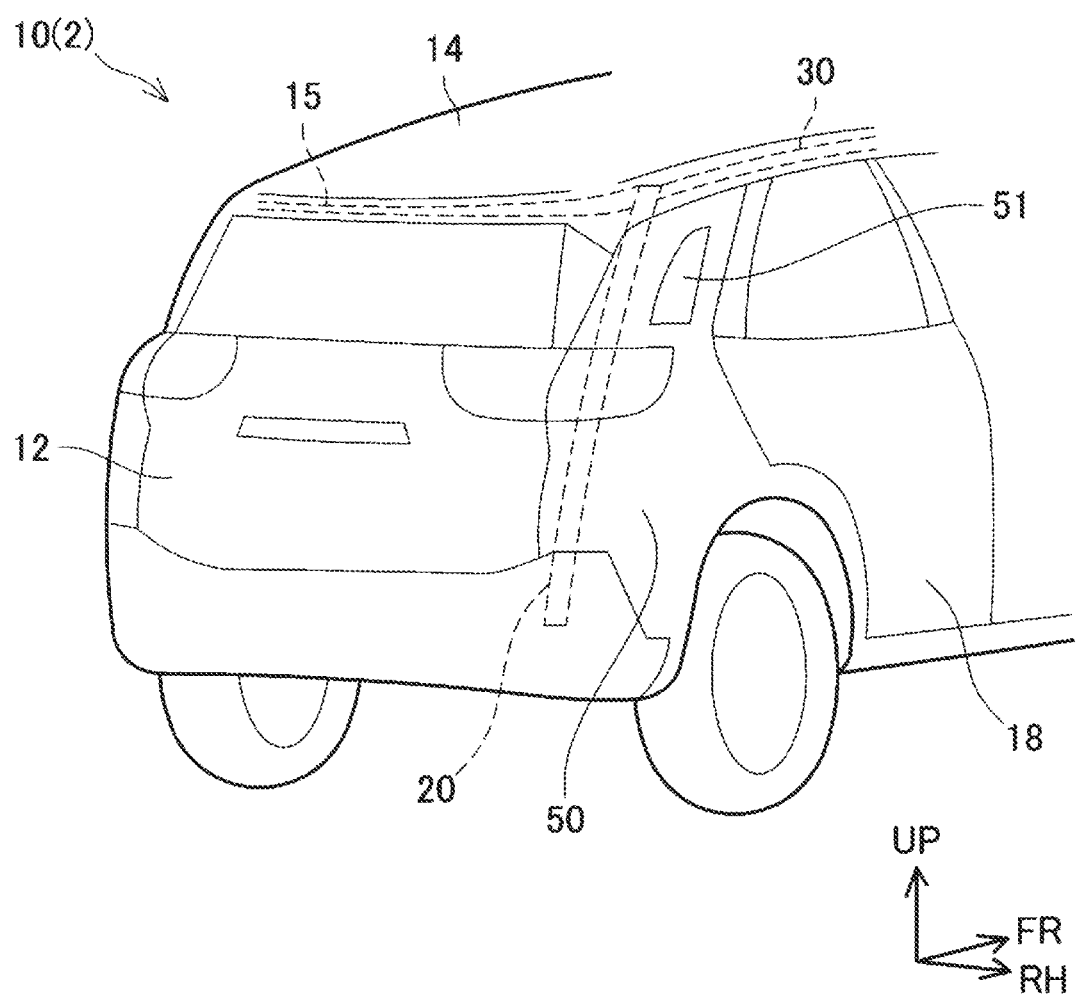
FIG. 1 is a perspective view of a rear portion of a vehicle body according to an embodiment.

A vehicle body 10 according to an embodiment will be described with reference to the drawings. FIG. 1 is a perspective view of a rear portion of the vehicle body 10. Note that the overall automobile, in which an unshown engine and so forth are added to the vehicle body 10, will be referred to as "automobile 2". In the drawings including FIG. 1, the arrow UP indicates the vehicle body upward direction, the arrow FR indicates the vehicle body forward direction, and the arrow RH indicates the vehicle body rightward direction. The vehicle body 10 includes a roof panel 14, a roof crossmember 15, a rear hatch 12, a roof siderail 30, a rear pillar 20, a side outer panel 50, and a rear door 18. The roof crossmember 15 is hidden behind the roof panel 14, and accordingly is illustrated by dashed lines. The roof siderail 30 and the rear pillar 20 on the right side are hidden behind the side outer panel 50, and accordingly are illustrated by dashed lines. The roof siderail and the rear pillar on the left side are omitted from illustration. The roof crossmember 15, the roof siderail 30, and the rear pillar 20 are a framework for ensuring strength of the vehicle body 10.

The rear hatch 12 is disposed at the lower portion of the rear end of the roof panel 14. The rear hatch 12 opens and closes an opening at the rear end of the vehicle body. The roof crossmember 15 is disposed upward from the rear hatch 12, and extends in the vehicle-width direction. The rear pillar 20 is disposed to the side of the rear hatch 12, and extends in the vehicle body up-down direction. The rear pillar 20 extends along the side edge of the rear opening of the vehicle body 10. The upper end of the rear pillar 20 is linked to the roof crossmember 15. The lower end of the rear pillar 20 is linked to a framework making up the lower portion of the vehicle body (e.g., rear side member), although this is omitted from illustration.

The roof siderail 30 extends in the front-rear direction of the vehicle body 10 at the side of the roof panel 14.

The upper end of the rear pillar at the left side is also linked to the roof crossmember 15, although this is omitted from illustration. That is to say, the roof crossmember 15 links the upper ends of a pair of rear pillars. The vehicle body 10 has a right-left pair of rear pillars and a right-left pair of roof siderails. However, the structures of the right and left rear pillars (and the right and left roof siderails) are equivalent, and accordingly description will be made below regarding the right-side rear pillar 20 and the right-side roof siderail 30.

The rear pillar 20 is disposed between the rear hatch 12 and the rear door 18. The rear pillar 20 is situated rearward from a quarter glass 51. Note that a "quarter glass" is a window glass that is fixed to the vehicle body 10 (in the side outer panel 50 and a later-described side inner panel 40), rearward of the rear door 18.

Figure 2:
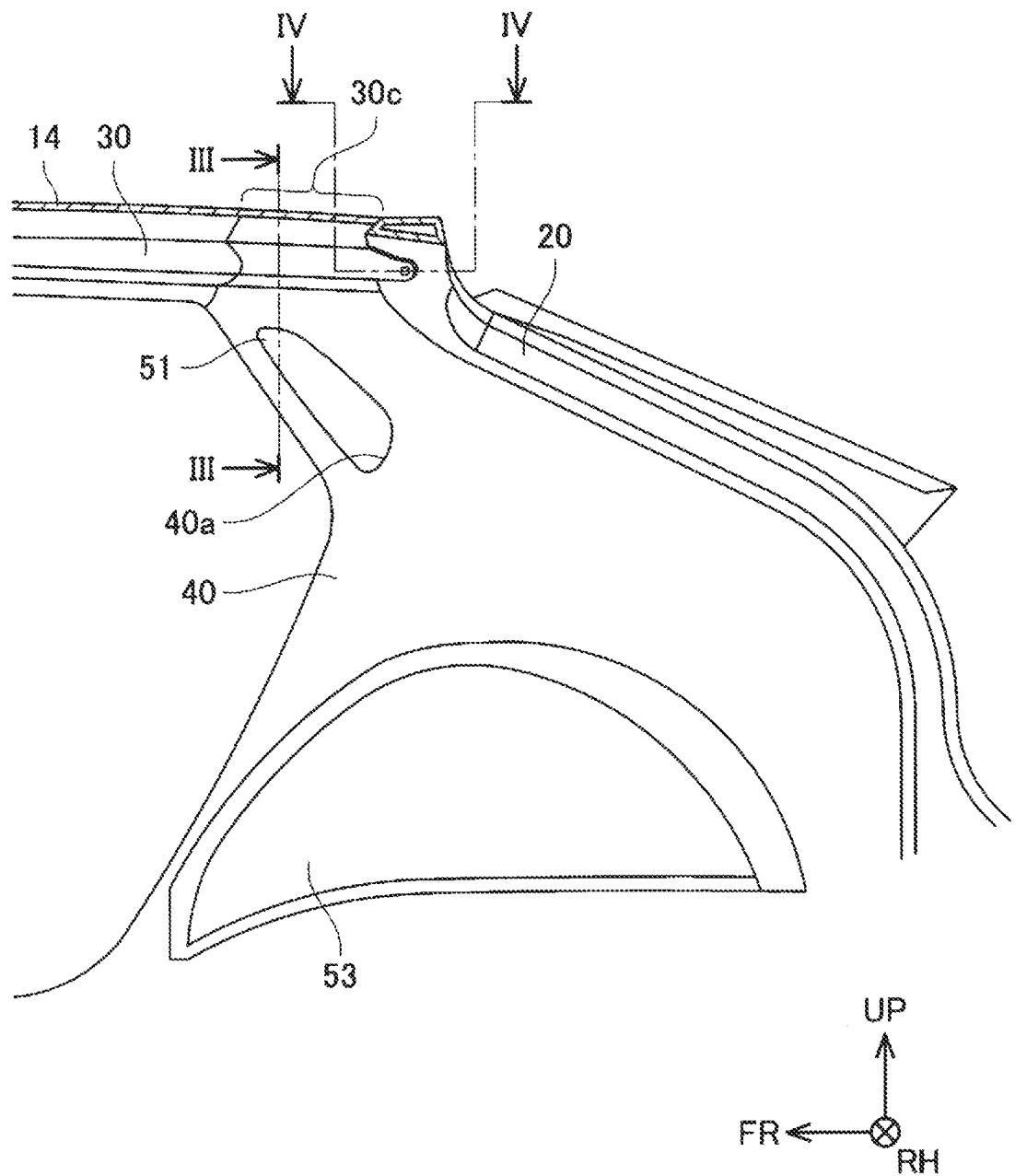
FIG. 2 is a diagram viewing a rear pillar and surroundings thereof from a vehicle cabin side.

FIG. 2 is a diagram viewing the rear pillar 20 from inside the vehicle cabin. Note that the rear hatch 12 is omitted from illustration. The rear end of the roof siderail 30 is linked to the rear pillar 20. The side inner panel 40 is linked to the roof siderail 30 and the rear pillar 20. The side inner panel 40 makes up a rear portion side face of the vehicle cabin space. The side inner panel 40 is provided with a window hole 40a to which the quarter glass 51 is fixed. A rear wheel house panel 53 is provided to the lower side of the side inner panel 40.

Figure 3:
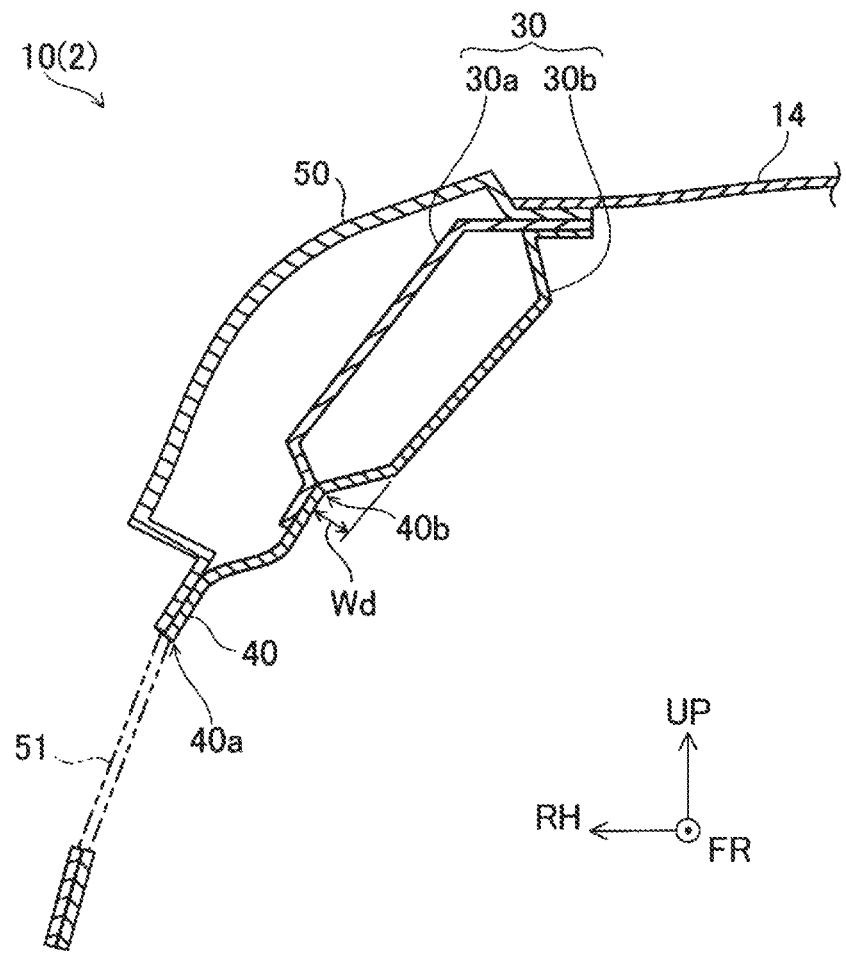
FIG. 3 is a cross-sectional view taken along line in FIG. 2.

FIG. 3 illustrates a cross-section taken along line in FIG. 2. The roof siderail 30 is configured of a siderail outer panel 30a and a siderail inner panel 30b. The respective upper portions and lower portions of the siderail outer panel 30a and the siderail inner panel 30b are joined to each other in planar contact. The roof siderail 30 has a tubular shape. In other words, the roof siderail 30 is a hollow beam. The side outer panel 50 and the roof panel 14 are linked to the upper end of the roof siderail 30. The lower end of the roof siderail 30 is linked to an upper end 40b of the side inner panel 40. Note that the siderail inner panel 30b is connected to the side inner panel 40 at the rear portion of the roof siderail 30 in FIG. 2 (a roof siderail rear portion 30c). In other words, the siderail inner panel 30b and the side inner panel 40 are configured of a single metal sheet at the roof siderail rear portion 30c. The siderail inner panel 30b is divided into the roof siderail rear portion 30c, and a portion forward from the roof siderail rear portion 30c, but the two are joined, and structurally, the siderail inner panel 30b is connected from a front pillar (A-pillar) to the rear pillar 20. At the portion forward of the roof siderail rear portion 30c, the lower end of the roof siderail 30 corresponds to the edge of the vehicle body opening for the rear door, as illustrated in FIG. 2.

The outer-side side face of the vehicle body 10 is covered by the side outer panel 50 (see FIG. 1). The roof siderail 30 and the side inner panel 40 are not visible from the outside of the automobile 2, due to the side outer panel 50.

The roof siderail 30 has a tubular shape, and bulges further into the vehicle cabin than the upper end 40b of the side inner panel 40. A width Wd shown in FIG. 3 corresponds to a range of how far the roof siderail 30 bulges out from the upper end 40b.

The advantage of the structure in which the roof siderail 30 bulges further to the vehicle cabin side than the upper end of the side inner panel 40 will be described. According to this structure, the rear end of the roof siderail 30 slightly shifts toward the center side of the vehicle body 10 (center side in the vehicle-width direction). This structure increases effects of the roof siderail 30 suppressing vibrations of the rear pillar 20 (vibrations in the vehicle-width direction at the upper portion of the rear pillar 20) while traveling. In other words, according to the above structure, rigidity of the vehicle body rear portion as to torsional vibration mode around a roll axis of the vehicle body becomes higher. That is to say, the strength of the rear portion of the vehicle body 10 increases. Suppressing vibrations of the rear pillar 20 while traveling suppresses vibrations of the side inner panel 40 as well, and quietness in the vehicle cabin while traveling improves.

Also, due to the above structure, the rear end of the roof siderail 30 is suppressed from collapsing toward the center direction of the vehicle body 10 in a small overlap collision. As a result, deformation of the rear portion of the vehicle cabin (deformation of the rear portion of the vehicle body 10) in a collision is suppressed.

Figure 4:
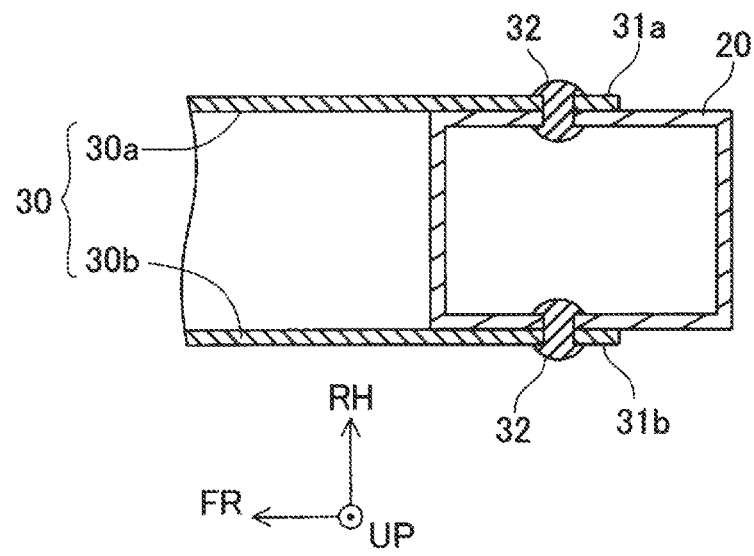
FIG. 4 is a cross-sectional view taken along line IV-IV in FIG. 2.

FIG. 4 shows a cross-section taken along line IV-IV in FIG. 2. FIG. 4 shows a cross-section of the roof siderail 30 and the rear pillar 20 at the linking portion of the roof siderail 30 and the rear pillar 20. The rear pillar 20 also has a tubular shape. In other words, the rear pillar 20 is a hollow beam. The cross-sectional form of the rear pillar 20 has been simplified in the illustration in FIG. 4.

Figure 5:
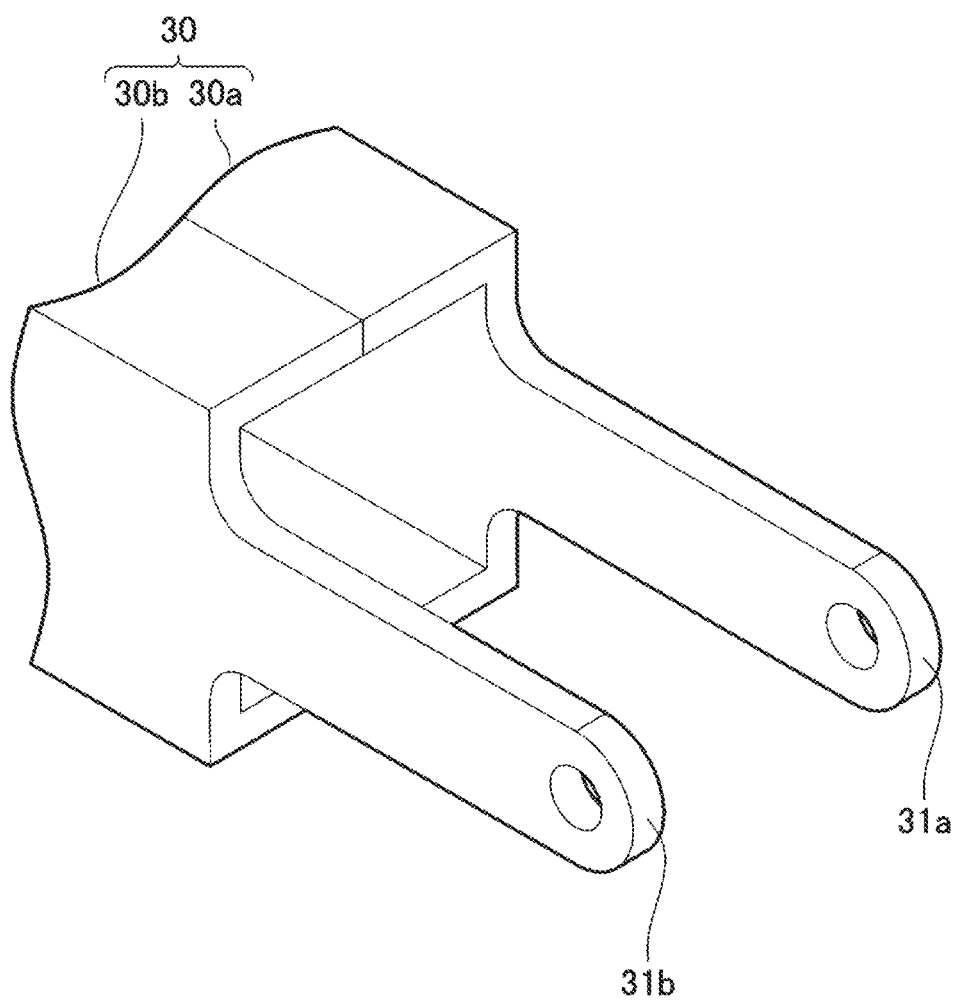
FIG. 5 is a perspective view of a roof siderail rear portion.

FIG. 5 is a perspective view of the rear portion of the roof siderail 30. Extending portions 31a and 31b extend rearward from both the right and left sides at the rear end of the roof siderail 30. The extending portion 31a extends rearward from the rear end of the siderail outer panel 30a, and the extending portion 31b extends rearward from the rear end of the siderail inner panel 30b. The two extending portions 31a and 31b sandwich the rear pillar 20. The extending portions 31a and 31b are each joined to the rear pillar 20 by spot welding 32. This structure increases the strength of the linking portion of the roof siderail 30 and the rear pillar 20. Each of the extending portions 31a and 31b and the rear pillar 20 may be joined by spot welding at a plurality of positions.

Noteworthy points regarding the technology described so far will be described here. The automobile 2 according to the embodiment is a hatchback type automobile that has the rear pillar 20 (D-pillar) in addition to an A-pillar (front pillar), a B-pillar (center pillar), and a C-pillar. The rear pillar 20 is situated to the side of the rear hatch 12. The technology disclosed in the present specification is also applicable to a sedan type automobile. In this case, the C-pillar is equivalent to the rear pillar 20 of the automobile 2 according to the embodiment. That is to say, when applying the technology disclosed in the present specification to a sedan type automobile, a structure is obtained in which the rear ends of the roof siderail is linked to the C-pillar, and the roof siderail bulges further to the vehicle cabin side than the upper end of the side inner panel.

In FIGS. 1 to 5, the roof siderail 30 and the rear pillar 20 are illustrated simplified. In FIG. 4 in particular, the rear pillar 20 is illustrated as a simple rectangular tube. In FIG. 5, the roof siderail 30 is illustrated as a simple rectangular tube. The roof siderail 30 and the rear pillar 20 may be a polygonal tube. The roof siderail 30 and the rear pillar 20 are hollow beams with polygonal cross-sectional forms.

Although specific examples of the present disclosure have been described above in detail, these are only exemplifications, and do not limit the Claims. The technology set forth in the Claims includes various modifications and alterations of the specific example exemplified above. Technical elements described in the present specification or the drawings exhibit technical utility, either singularly or through various types of combinations, and do not limit combinations set forth in the Claims at the time of application. Also, the technology exemplified in the present specification or the drawings may achieve a plurality of objects simultaneously, and achieving one of these objects in itself has technical utility.

What is claimed is:

1. A vehicle body, comprising:
a rear pillar that is disposed to a side of a rear hatch, and that extends in an up-down direction;
a roof siderail that extends in a vehicle body front-rear direction at a side of a roof, a rear end of the roof siderail being linked to the rear pillar; and
a side inner panel that is linked to the rear pillar and the roof siderail, wherein the roof siderail has a tubular shape, and bulges further into a vehicle cabin than an upper end of the side inner panel, extending portions extend from both right and left sides of the rear end of the roof siderail, and the two extending portions sandwich the rear pillar.

2. The vehicle body according to claim 1, wherein the side inner panel is provided with a window hole in which a quarter glass is attached.

3. The vehicle body according to claim 1, wherein a rear portion of a vehicle cabin side of the roof siderail, and the side inner panel, are configured from a single metal sheet.

* * * * *